US009348623B2

(12) United States Patent
Dunning et al.

(10) Patent No.: US 9,348,623 B2
(45) Date of Patent: *May 24, 2016

(54) MANAGEMENT OF INTER-DEPENDENT CONFIGURATIONS OF VIRTUAL MACHINES IN A CLOUD

(71) Applicant: Red Hat Inc., Raleigh, NC (US)

(72) Inventors: John Dunning, Stow, MA (US); Scott Wayne Seago, Warwick, MA (US); Christopher Lalancette, Raleigh, NC (US); Carl Trieloff, Littleton, MA (US); Ian Scott McLeod, Chicago, IL (US); Greg D. Blomquist, Apex, NC (US)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/717,956

(22) Filed: May 20, 2015

(65) Prior Publication Data
US 2015/0254096 A1 Sep. 10, 2015

Related U.S. Application Data

(63) Continuation of application No. 13/349,508, filed on Jan. 12, 2012, now Pat. No. 9,043,784.

(51) Int. Cl.
*G06F 9/455* (2006.01)
*H04L 12/24* (2006.01)
*G06F 9/445* (2006.01)

(52) U.S. Cl.
CPC ............ *G06F 9/455* (2013.01); *H04L 41/0803* (2013.01); *H04L 41/0806* (2013.01); *G06F 9/44505* (2013.01); *G06F 9/45558* (2013.01); *G06F 2009/4557* (2013.01); *G06F 2009/45595* (2013.01); *H04L 12/2424* (2013.01); *H04L 41/08* (2013.01)

(58) Field of Classification Search
None
See application file for complete search history.

(56) References Cited

U.S. PATENT DOCUMENTS

| 6,199,204 | B1 | 3/2001 | Donohue |
| 7,424,602 | B2 * | 9/2008 | Reiss .................. G06F 9/44505 713/1 |
| 7,849,460 | B1 | 12/2010 | Martin et al. |
| 8,146,098 | B2 | 3/2012 | Fitzgerald et al. |
| 8,484,637 | B2 | 7/2013 | Farhangi et al. |
| 8,489,995 | B2 | 7/2013 | von Eicken et al. |
| 8,832,691 | B2 | 9/2014 | Fitzgerald et al. |
| 2003/0088663 | A1 | 5/2003 | Battat et al. |
| 2008/0134175 | A1 | 6/2008 | Fitzgerald et al. |
| 2008/0134176 | A1 | 6/2008 | Fitzgerald et al. |
| 2008/0134178 | A1 | 6/2008 | Fitzgerald et al. |
| 2008/0250405 | A1 * | 10/2008 | Farhangi .................. G06F 8/61 717/177 |
| 2009/0199116 | A1 | 8/2009 | von Eicken et al. |
| 2009/0241030 | A1 * | 9/2009 | von Eicken ............. H04L 67/00 715/735 |

(Continued)

OTHER PUBLICATIONS

Open Virtualization Format White Paper, Version 1.0, Feb. 6, 2009.

(Continued)

*Primary Examiner* — Qing Wu
(74) *Attorney, Agent, or Firm* — Withrow & Terranova, P.L.L.C.

(57) ABSTRACT

A server computer system determines that configuring a first virtual machine in a cloud depends on a configuration result of configuring a second virtual machine. The server computer system configures the second virtual machine in the cloud and configures the first virtual machine in the cloud using the configuration result of the second virtual machine.

23 Claims, 8 Drawing Sheets

(56) References Cited

U.S. PATENT DOCUMENTS

| | | |
|---|---|---|
| 2010/0042988 A1 | 2/2010 | Lundin et al. |
| 2011/0225575 A1 | 9/2011 | Ningombam et al. |
| 2011/0283138 A1 | 11/2011 | Sangubhatla et al. |
| 2011/0283270 A1 | 11/2011 | Gass et al. |
| 2013/0232122 A1 | 9/2013 | Fitzgerald et al. |
| 2013/0232586 A1 | 9/2013 | Fitzgerald et al. |
| 2014/0289730 A1 | 9/2014 | Fitzgerald et al. |

OTHER PUBLICATIONS

Automating Deployment and activation of virtual images, Le He et. al., Feb. 2008.

Automating System Tests Using Declarative Virtual Machines, Sander van der Burg et. al., Nov. 2010.

* cited by examiner

```
                <assembly>                                  300
                   <name>LBassy</name>
       302      <image>
           ↘     <name>LBtmpl</name>
                  <services>        303
                    <provides>
       301           <service>             305
                       <name>LBservice</name>      309
                       <param>
                          <name>config-ip-address</name>
           307          <value>                          313
                             <compute-from-instance key=eth0-address>
                          </value>
                       </param>
                       <param>           311
                          <name>config-port</name>         315
                          <value><fixed value=8080></value>
                       </param>
                     </service>
                   </provides>
                 </services>
               </image>
             </assembly>
```

FIG. 3A

```
                                           351              350
           <assembly>
              <name>Appserverassy</name>
              <image>
                  <name>Apptmpl</name>
                  <services>
                       <relies>         359
              357      <service>
                          <name>LBservice</name>          361A
                          <param>
                             <name>config-ip-address</name>
                          </param>
                          <param>
                             <name>config-port</name>
                          </param>
                       </service>              361B
                       </relies>
                  </services>
              </image>
           </assembly>
```

FIG. 3B

```
<template>
   <name>LBtmpl</name>                401
   <base-os>RHEL5.5</base-os>
   <packages>
      <package>my-lb-software</package>
      ...                             403
   </packages>
   ...
</template>
```

```
      <template>
         <name>Apptmpl</name>
         <base-os>RHEL5.5</base-os>
         <packages>
            <package>app-server-app</package>
 453        ...
            <package>my-puppet-plugin-for-lb-software</
      package>
         </packages>
       </template>
```

MANAGEMENT OF INTER-DEPENDENT CONFIGURATIONS OF VIRTUAL MACHINES IN A CLOUD

RELATED CASES

This is a continuation of, and claims priority and the benefit of, U.S. patent application Ser. No. 13/349,508, entitled "Management of Inter-Dependent Configurations of Virtual Machines in a Cloud", to by Dunning et. al., filed on 12 Jan. 2012, the entire contents of which are incorporated herein.

TECHNICAL FIELD

Embodiments of the present invention relate to configuration of virtual machines and, more particularly, to a technique of managing inter-dependent configurations of virtual machines in a cloud.

BACKGROUND

Cloud computing is generally becoming the platform of choice for businesses that want to reduce operating expenses and be able to scale resources rapidly. Eased automation, flexibility, mobility, resiliency, and redundancy are several other advantages of moving resources to the cloud. Many organizations are being introduced to cloud computing by building an on-premise Infrastructure-as-a-Service (IaaS) cloud, which delivers computing, storage, and networking resources to users. Virtual machines in cloud computing are, for the most part, ephemeral. The state of a virtual machine is not persistent and is lost at shut down. A set of virtual machines can be launched with a particular configuration in a cloud one day and can be launched in a different cloud provider environment the next day. Traditional solutions typically have application developers manually define and set up configuration files of various sorts. At deployment, an extensive amount of time and work is dedicated to setting up the configuration on each individual machine, in order to get the machine to communicate with other systems, resources, etc. Configuration is particularly slow and prone to error if the configuration of some virtual machines depends on the configuration of other virtual machines.

BRIEF DESCRIPTION OF THE DRAWINGS

Various embodiments of the present invention will be understood more fully from the detailed description given below and from the accompanying drawings of various embodiments of the invention.

FIG. 3A illustrates an exemplary assembly of a virtual machine providing configuration parameter values.

FIG. 3B illustrates an exemplary assembly used with some embodiments of the invention.

FIGS. 4A-B illustrate exemplary templates used with some embodiments of the invention.

DETAILED DESCRIPTION

Embodiments of the invention are directed to a method and system for managing inter-dependent configurations of virtual machines in a cloud. The embodiments can be used to manage configurations of physical machines, or combinations of physical and virtual machines. A server computer system determines that configuring a first virtual machine (VM) in a cloud depends on a configuration result of configuring a second VM. For example, the server computer system identifies an application server VM that is to be configured in a cloud. The application server VM is to be configured to communicate with a load-balancer server VM. The server computer system determines that the configuration information of the application server VM relies on a value that is generated when the server computer system configures the load-balancer server VM. For example, the configuration information of the application server VM relies on an IP (internet protocol) address of the load-balancer server VM. The IP address of the load-balancer server VM is not assigned until the server computer system configures the load-balancer server VM. The server computer system configures the second VM in the cloud (e.g., load-balancer server VM) to generate the value (e.g., IP address) to be used to configure the first VM and configures the first VM (e.g., application server VM) in the cloud to use the configuration result (e.g., IP address) of the second VM.

Embodiments speed up the process of configuring inter-dependent virtual machines by determining which configurations are independent and which configurations are dependent on other configurations. Embodiments provide an efficient configuration process by ordering the configurations such that the independent configurations occur before the dependent configurations. Embodiments provide flexibility by creating and using data (e.g., deployables, assemblies, and templates) that abstractly describes the configurations of the virtual machines and the relationships between a group of virtual machines that are deployed together.

Figure 1:
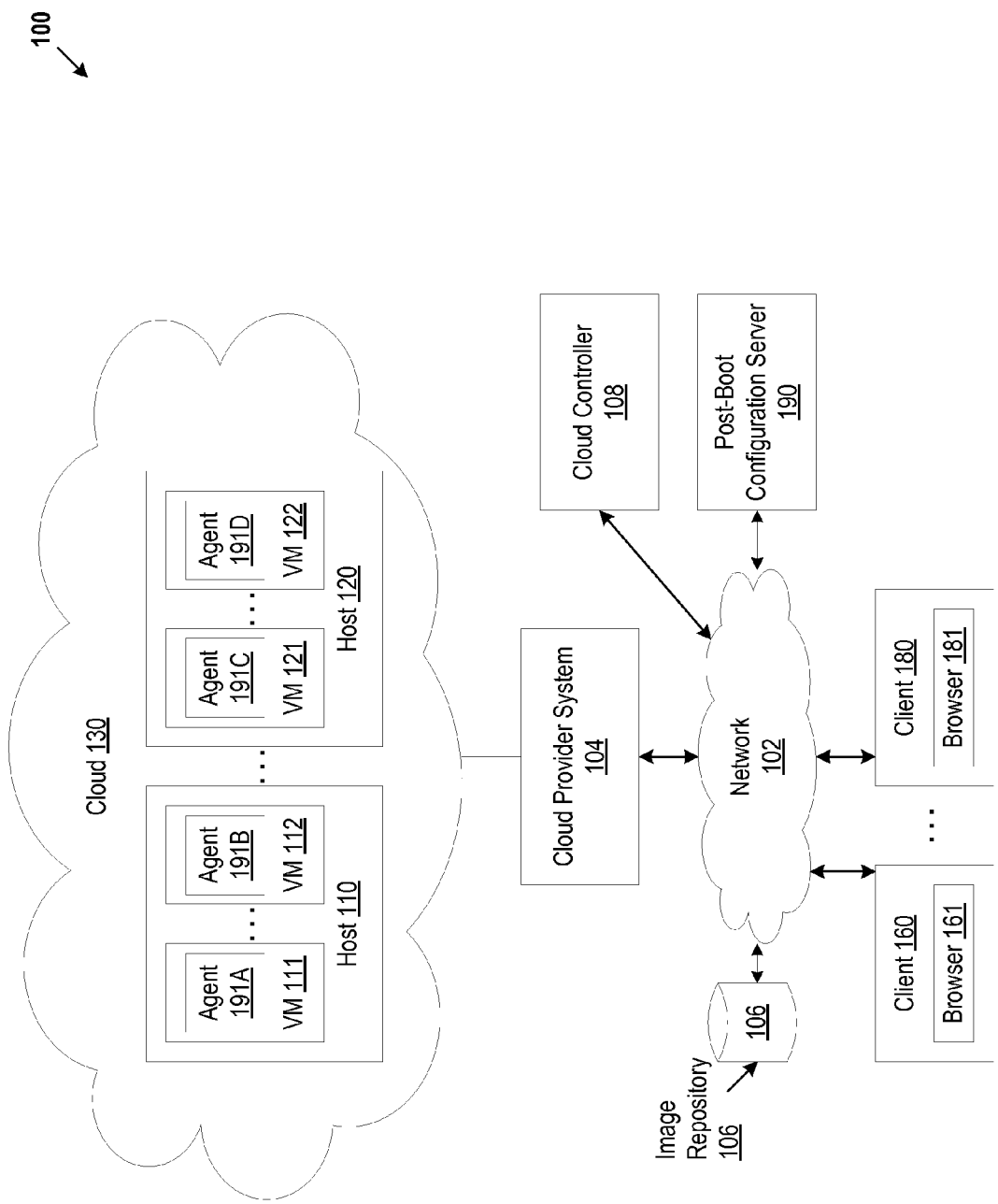
FIG. 1 illustrates exemplary system architecture, in accordance with various embodiments of the present invention.

FIG. 1 is a block diagram of a network architecture 100 for a distributed computing system, in which embodiments of the invention may operate. The network architecture 100 includes a cloud 130 managed by a cloud provider system 104. The cloud 130 provides virtual machines, such as virtual machines 111, 112, 121, and 122. There can be any number of virtual machines in a cloud 130. Each virtual machine is hosted on a physical machine configured as part of the cloud 130. Such physical machines are often located in a data center. For example, virtual machines 111 and 112 are hosted on physical machine 110 in cloud 130 provided by cloud provider 104. The cloud provider system 104 and cloud 130 may be provided as an infrastructure as a service (IaaS) layer. The cloud provider system 104 and cloud 130 may be provided by, for example, a third party cloud provider. Users can interact with applications executing on cloud-based virtual machines using client computer systems, such as clients 160,180, via corresponding web browser programs 161,181. Users may have one or more accounts associated with a cloud provider system 104.

Clients 160,180 are connected to hosts 110, 120 and the cloud provider system 104 via a network 102, which may be may be a private network (e.g., a local area network (LAN), a wide area network (WAN), intranet, or other similar private networks) or a public network (e.g., the Internet). Each client 160, 180 may be a mobile device, a PDA, a laptop, a desktop computer, or any other computing device. Each host 110, 120 may be a server computer system, a desktop computer or any other computing device. The cloud provider system 104 may include one or more machines such as server computers, desktop computers, etc.

In one embodiment, the cloud provider system 104 is coupled to a cloud controller 108 and a post-boot configuration server 190 via the network 102. The cloud controller 108 and post-boot configuration server 190 may reside on the same machine or different machines (e.g., server computers, desktop computers, etc.). The cloud controller 108 and post-boot configuration server 190 may be maintained by a cloud consumer of cloud 130, such as an enterprise (e.g., business, company). In another embodiment, the cloud controller 108 and post-boot configuration server 190 may be maintained by a third party cloud provider.

The cloud controller 108 may manage the execution of applications in the cloud 130. The cloud controller 108 may receive input, for example, from a system administrator via a client 160,180, describing VMs 111,112,121,122 to be deployed in the cloud 130 for execution of the applications. The image repository 106 can be populated with application deployment data to be used to deploy the VMs 111,112,121, 122. In one embodiment, the cloud controller 108 generates the application deployment data based on the user input and stores the application deployment data in the image repository 106. The repository 106 may reside locally or remotely and may represent a single data structure or multiple data structures (databases, repositories, files, etc.) residing on one or more mass storage devices, such as magnetic or optical storage based disks, solid-state drives (SSDs) or hard drives.

Figure 2:
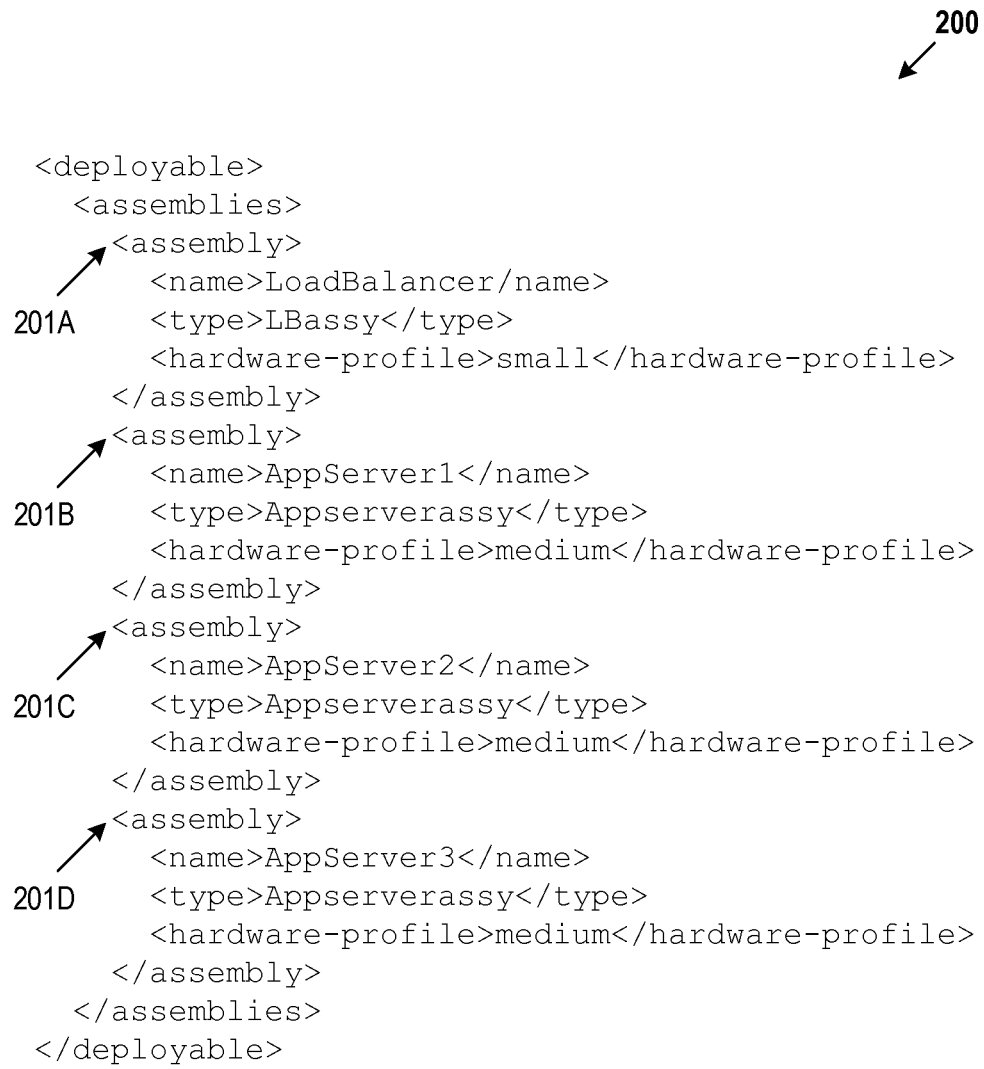
FIG. 2 illustrates an exemplary deployable used with some embodiments of the invention.

The application deployment data can be described in a structured format that specifies the bootable operating system, any software requirements, configuration provided or required, and any specific targeting information to instantiate a virtual machine. The application deployment data can be a hierarchy of data that includes deployables, assemblies, and templates. Each deployable describes an overview of one or more virtual machines to be deployed as a group. A deployable can describe a deployment of any number of virtual machines. A deployable can describe arbitrarily large and complex deployments of virtual machines. A deployable can describe a deployment of a small number of virtual machines. For brevity and simplicity, a deployment of four virtual machines is used as an example in architecture 100. A deployable can be an XML file. FIG. 2 illustrates an exemplary deployable 200 that lists the four virtual machines to be deployed together, according to one embodiment. The deployable 200 describes a load-balancer server VM and three application server VMs at a high level by referencing an assembly for each VM. The deployable 200 includes references to a load-balancer server assembly 201A and three application server assemblies 201B-D.

An assembly is a description of a virtual machine to be deployed. An assembly can be an XML file. An assembly can include the description of a service to be provided by a virtual machine, the description of a service to be used by a virtual machine, the description of one or more parameter values provided by or relied by a virtual machine. FIGS. 3A-B illustrate exemplary assemblies according to some embodiments. Assembly 300 in FIG. 3A is a description for a load-balancer server VM. For example, assembly 201A in deployable 200 in FIG. 2 is a reference to assembly 300. Assembly 300 includes a template attribute 302 to identify the one or more templates that further describe the load-balancer server VM. Some embodiments of a template is described in greater detail below in conjunction with FIGS. 4A-B. Assembly 300 includes a service attribute 301 to indicate the service(s) to be provided by the load-balancer server VM or the services that are used by the load-balancer server VM. Assembly 300 includes an attribute to indicate whether a service is being provided or a service is being relied upon. For example, attribute 303 indicates that the load-balancer server VM provides a load-balancer service named LBservice 305. Assembly 300 includes parameter attributes 307 that lists the parameter values that are provided by the load-balancer server VM, or relied on by the load-balancer server VM and can be used to configure and tie the assemblies of a deployment together at launch. For example, the load-balancer server VM provides an IP address parameter 309 and a port number parameter 311 that can be used by another virtual machine (e.g., an application server VM). An assembly can include an attribute that describes how the parameter value is determined. For example, assembly 300 includes an attribute 313 indicating a parameter value is a computed value and an attribute 315 indicating a parameter value is a fixed value. An assembly can include an attribute indicating a parameter value is user-provided. FIG. 3B illustrates an exemplary assembly 350 for an application server VM. For example, the assemblies 201B-D included in deployable 200 in FIG. 2 are references to assembly 350. Assembly 350 identifies a template name Apptmpl template 351. Assembly 350 includes a service attribute 357 to indicate the service(s) that are relied upon by the application server VM. For example, the an application server VM relies upon a load-balancer service named LB service 359. The assembly 350 can include parameter attribute(s) 361A,B that indicate the parameter values that are to be provided by the LBservice in order to configure the application server VM. The parameter values are used to tie the launch of an application in the application server VM and the launch of an application in the load-balancer server VM together. For example, the configuration of an application server VM relies on an IP address parameter value and a port parameter value generated by configuration a load-balancer server VM.

A template is a description of a disk image and meta-data for creating a virtual machine image. A virtual machine image can be created based on a template. A virtual machine image can be launched to instantiate (create) a virtual machine in a cloud. A template can be an XML file. FIGS. 4A-B illustrate exemplary templates according to some embodiments. FIG. 4A illustrates an exemplary template 400 for creating a load-balancer server VM. For example, the template LBtmpl 302 that is identified in assembly 300 is a reference to template 400. A template lists the software and configuration data for the VM. For example, template 400 identifies the base operating system 401 to be loaded for the load-balancer server VM and the software package(s) 403 to be loaded for the load-balancer server VM. FIG. 4B illustrates an exemplary template 450 for an application server VM. Template 450 identifies the base operating system 451 and the software package(s) 453 to be loaded for an application server VM.

Returning to FIG. 1, upon receiving a command identifying a specific deployable to launch, the cloud provider system 104 retrieves a reference to the existing image for each VM available to be run/cloned on top of a hypervisor (not shown). If the image is not in the image repository 106, other elements of the stack may be used to place the image in the repository 106. The command may be received from the cloud controller 108 or a user (e.g., a system administrator) via a console computer or a client machine. The images can be launched in the cloud 130 to instantiate the virtual machines 111,112,121, 122 for the deployable. Launch of a virtual machine can include powering on or booting a virtual machine.

The post-boot configuration server 190 can detect the virtual machines 111,112,121,122 that have been started (e.g., powered on or booted) for a deployable and can configure the started VMs 111,112,121,122 based on the application deployment data that corresponds to the virtual machines in the image repository 106. The resulting configuration can include, for example, setting IP addresses, starting services, etc. for the images to properly run. For example, in the case of a load-balancer server VM (e.g., VM 111), a pool of IP addresses should be provided to the load-balancer server VM and policies in the load-balancer server VM should be set. In another example of a web server VM (e.g., VM 121), the web server VM (e.g., VM 121) should be configured with a default gateway and web service(s) should be started.

Configuration parameters for one or more virtual machines may rely on parameter values generated by configuring other virtual machines. The post-boot configuration server 190 can determine which VM configurations depend on configuration results of other VM configurations, determine a dependency order in which to configure the VMs, and configure the VMs in the particular order. Examples of a configuration result can include a parameter value and the start of a service. The post-boot configuration server 190 can use a deployable to determine how many virtual machines to configure. The post-boot configuration server 190 can use assemblies that are referenced in the deployable and/or templates that are referenced in an assembly to determine which of the virtual machines provide a service (e.g., load-balancer VM provides a load-balancer service) and which of the virtual machines use a service (e.g., application server VM uses a load-balancer service). The post-boot configuration server 190 can use assemblies and/or templates to determine which parameter values depend on configuring other VMs.

The post-boot configuration server 190 can communicate with agents 191A-D running in the virtual machines to manage the inter-dependent configurations. The cloud controller 108 can generate and store images in the repository 106 that include an executable of an agent 191A-D. When a virtual machine image is launched (e.g., powered-on, booted) on a host in the cloud 130, the agent 191A-D executes in a corresponding virtual machine 111,112,121,122 to communicate with the post-boot configuration server 190.

Each agent 191A-D can provide a unique identifier (UID) to the post-boot configuration server 190 to represent a corresponding virtual machine. A UID can include a situationally unique (or a contextually unique identifier. The agents 191A-D can receive post-boot configuration script(s) associated with the UID from the post-boot configuration server 190. The post-boot configuration scripts(s) can be stored in a repository (e.g., repository 106) coupled to the post-boot configuration server 190. The agents 191A-D can execute the post-boot configuration script(s) to generate a configuration result, such as a value for at least one parameter to be used in configuring another virtual machine. The agents 191A-D can provide the configuration result to the post-boot configuration server 190.

For example, a deployable describes four virtual machines 111,112,121,122 to be launched (e.g., powered-on, booted). The VMs can include a load-balancer server VM (e.g., VM 111) and three application server VMs, (e.g., VM 112,121, 122). The configuration parameters of the three application server VMs may rely on the IP address and port number that is assigned to the load-balancer server VM (e.g., VM 111) when the load-balancer server VM is configured. The post-boot configuration server 190 can send a post-boot configuration script, such as an IP configuration script, to the agent 191A in the load-balancer server VM (e.g., VM 111). The agent 191A can run the IP configuration script to generate a configuration result (e.g., the value of the IP address and port number of the load-balancer server VM). The agent 191A can send the configuration result (e.g., IP address and port number) to the post-boot configuration server 190. Upon determining that the load-balancer server VM configuration is complete, the post-boot configuration 190 may determine that the three application server VMs (e.g., VM 112,121,122) are ready to be configured. The post-boot configuration server 190 can send a post-boot configuration script, such as an application configuration script, that includes a configuration result (e.g., IP address and port number of a load-balancer VM) to the agents 191B-D of the three application server VMs (e.g., VM 112,121,122). Each agent 191B-D can run the post-boot configuration script to add the configuration result to configuration information of the corresponding VM. One embodiment of agents communicating with a post-boot configuration server is described in greater detail below in conjunction with FIG. 7.

Figure 5:
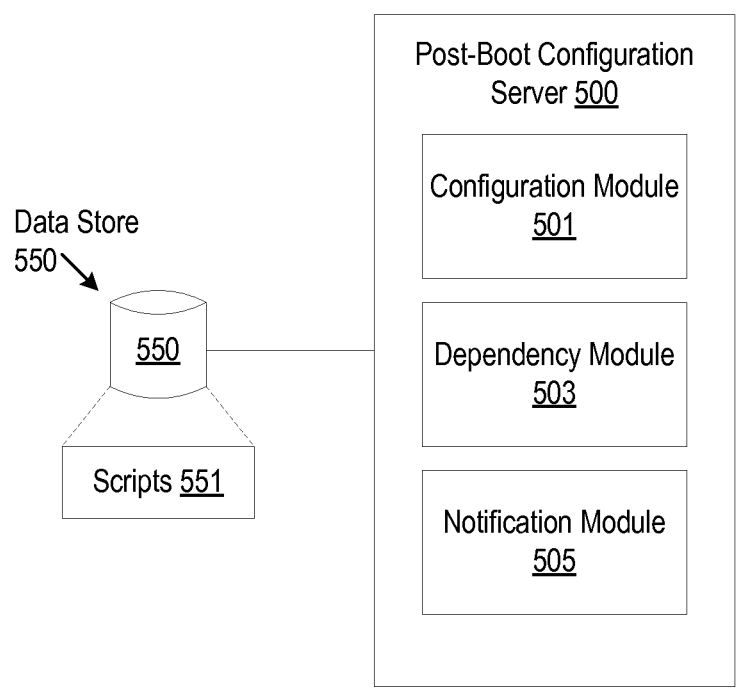
FIG. 5 is a block diagram of a post-boot configuration server, in accordance with an embodiment.

FIG. 5 illustrates a block diagram of a post-boot configuration server 500, according to one embodiment. Post-boot configuration server 500 may correspond to a post-boot configuration server 190 of FIG. 1. In one embodiment, post-boot configuration server 500 includes a configuration module 501, a dependency module 503, and a notification module 505. Note that in alternative embodiments, one or more of the configuration module 501, dependency module 503, and/or notification module 505 may be combined into a single module. Additionally, the functionality of any of the configuration module 501, dependency module 503, and notification module 505 may be divided between multiple modules.

The configuration module 501 can identify virtual machine(s) that are to be configured in a cloud. The configuration module 501 may receive a UID, of each VM to be configured, from an agent in a corresponding VM, from a cloud controller (e.g., cloud controller 108 in FIG. 1) or from a user (e.g., system administration). The configuration module 501 can receive credentials for accessing the cloud and can establish communication with an agent on each VM using the credentials. The configuration module 501 can retrieve application deployment data (e.g., an ICICLE, template, assembly, deployable) for the VMs from an image repository (e.g., image repository 106 in FIG. 1) based on the UID. In one embodiment, a cloud controller may generate the application deployment data based on user input from a user (e.g., system administrator) and store the data in the image repository. An ICICLE (image content and intended configuration language) is a detailed description of the software installed and software revisions in the disk image (e.g., image in the repository 106 in FIG. 1 that is generated from a template).

The dependency module 503 can construct a dependency graph to represent which configuration parameter values of the VMs are to be satisfied by configuration results from configuring other VMs. A dependency graph is a directed graph representing dependencies of several objects towards each other. The dependency module 503 can search templates, assemblies, and deployables for attributes that describe whether a VM provides a service, a VM relies on a service, a VM provides a parameter, a VM relies on a parameter value, a parameter value is a computed value, a parameter value is a fixed value, a parameter value is a user-provided value, etc., to create the dependency graph. In one embodiment, the dependency graph includes nodes to represent VMs, services, parameters, values, etc., and lines connecting the nodes to represent a relationship and/or dependency between them.

The dependency module 503 can determine from the dependency graph which VMs have configuration parameter values that depend on a configuration result generated by configuring other VMs and/or provided by a user. The dependency module 503 can determine which VMs have configuration information that is complete and which VMs have configuration information that is incomplete. AVM has incomplete configuration information if the VM has at least one configuration parameter value that is dependent on a user-provided value or a value generated by configuring another VM. AVM has complete configuration information if the VM does not have any configuration parameter values that are dependent on another VM or a user-provided value.

The configuration module 501 can configure the VMs that have complete configuration information by sending one or more post-boot configuration scripts 551 that are stored in a data store 550 that is coupled to the post-boot configuration server 500 to the agents in the VMs. The post-boot configuration scripts 551 can be executed by an agent in a virtual machine. Examples of post-boot configuration scripts 551 can include, and are not limited to, web IP configuration scripts, cloud configuration scripts, database configuration scripts, and application server configuration scripts. The agents run the post-boot configuration scripts to generate parameter values and send parameters values to the post-boot configuration server. The agents can also send a notification to the post-boot configuration server that a configuration is complete. One embodiment of agents communicating with a post-boot configuration server is described in greater detail below in conjunction with FIG. 7. The configuration module 501 can configure the VMs that have incomplete configuration information using the parameter values received from the agents. One embodiment of configuring VMs that have incomplete configuration information is described in greater detail below in conjunction with FIG. 6.

The notification module 505 can send a notification to prompt a user, such as a system administrator, to supply parameter values that are not supplied by some other agent. Examples of other agents can include, and are not limited to, another VM instance and a value which is derived from the deployment environment. The notification module 505 can send a notification, for example, to another system, such as a cloud controller, and/or a user (e.g., system administrator) of an error if the dependency module 503 determines that not all of the dependent values in the dependency graph can be resolved, for example, by another VM or by a user-provided value. The notification module 505 can send a notification to another system and/or a user when the VMs have been configured. The notification module 505 can generate a system message. In another example, the notification module 505 can generate a user interface accessible via a browser to notify the user. In another example, the notification module 505 can generate and send an email message, a text message, an instant message, a social networking message, a visual alert, and/or a sound alert to notify one or more users.

Figure 6:
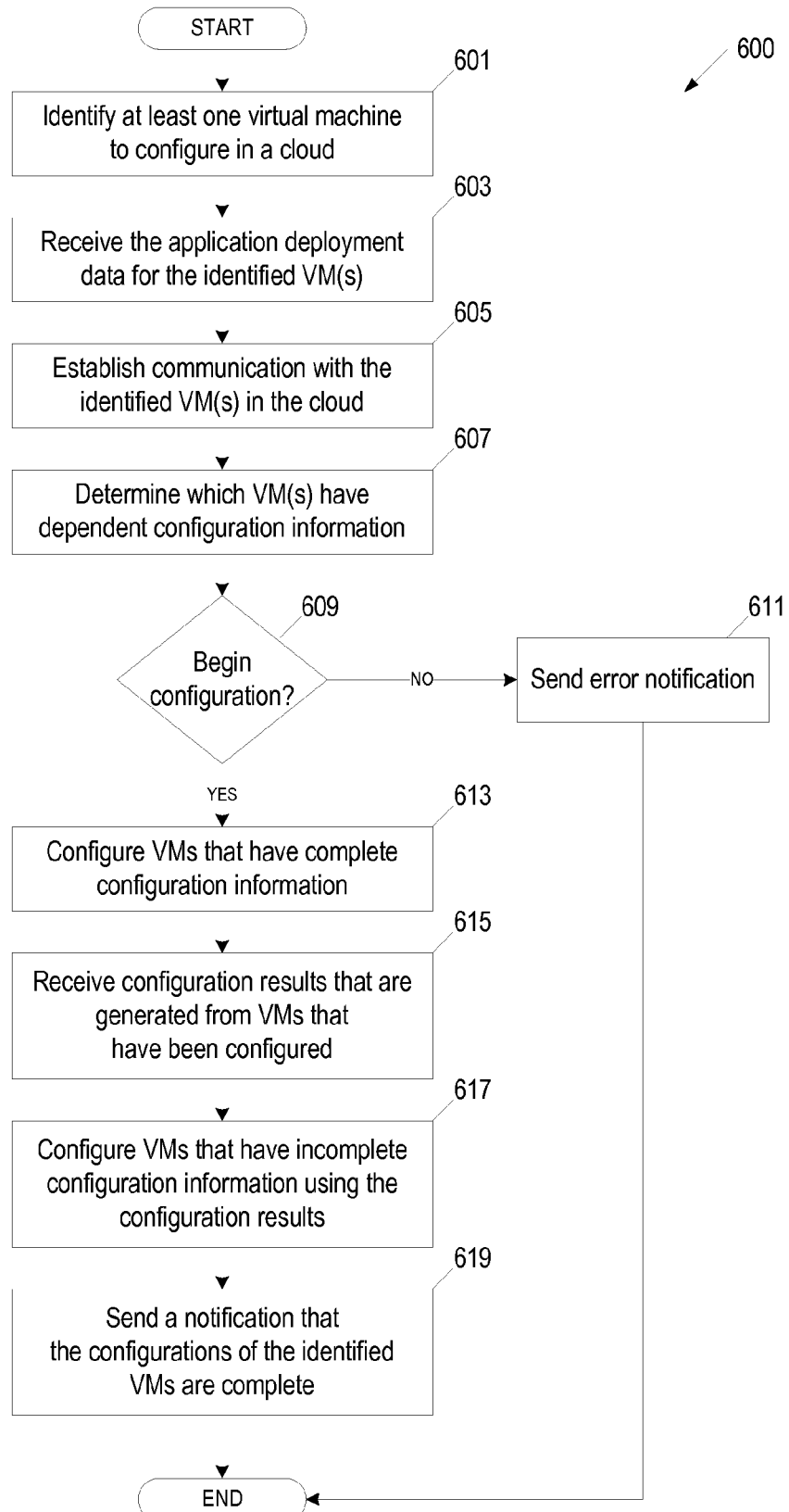
FIG. 6 is a flow diagram illustrating an embodiment for a method of managing inter-dependent configurations of virtual machines in a cloud.

FIG. 6 is a flow diagram of an embodiment of a method 600 for configuring inter-dependent virtual machines. The method 600 is performed by processing logic that may comprise hardware (circuitry, dedicated logic, etc.), software (such as is run on a general purpose computer system or a dedicated machine), or a combination of both. In one embodiment, the method 600 is performed by the post-boot configuration server 190 of FIG. 1.

At block 601, processing logic identifies at least one virtual machine (VM) to configure in a cloud and obtains the application deployment data (e.g., ICICLE, deployable, assemblies, and/or templates) for the VM at block 603. Processing logic can receive a UID for each VM to be configured and use the UID to retrieve the application deployment data for the corresponding VM from an image repository that is coupled to the post-boot configuration server. Processing logic can also receive a one time credential and other host identity for each VM. The credential allows processing logic to communicate with VM in the cloud. The UID, credential, host information may be received from a cloud controller or a user.

At block 605, processing logic establishes communication with the VM(s) that have been started in the cloud. The identified VMs are started (e.g., powered-on, booted) in the cloud, for example, by a cloud controller. The start of the VMs in the cloud executes an agent in each VM to contact and communicate with the post-boot configuration server. One embodiment of an agent communicating with a post-boot configuration server is described in greater detail below in conjunction with FIG. 7. Processing logic can establish a temporary and secure connection with the VM(s) using the received one time credential, other host identity, and/or application deployment data for the corresponding VM. Processing logic can establish VPN (virtual private network) connections. Each agent on a VM can send its UID to the processing logic. Processing logic can confirm the UID from the agent is one of the UIDs received from the cloud controller or a user.

At block 607, processing logic determines from the application deployment data that configuring at least one of the VMs depends on a configuration result of configuring at least one other VM. At least one virtual machine has configuration information that is dependent on a configuration result of configuring at least one other VM. The dependent configuration information has at least one parameter that is to be assigned a value that is generated when processing logic configures another virtual machine or at least one parameter that is to be assigned a user-provided value. Processing logic can make the determination by creating a dependency graph based on the application deployment data for the VMs. Processing logic can search the application deployment data (e.g., templates, assemblies, deployables) for indicators (e.g., attributes, tags) indicating a dependent parameter value to create the dependency graph. For example, processing logic locates a tag in a template indicating a configuration of an application server VM depends upon an IP address and port number of a load-balancer server VM, and generates the dependency graph based on this information. The dependency graph can show that a configuration for an application server relies on the IP address and port number of a load-balancer server VM.

At block 609, processing logic determines whether to begin configuring the VMs based on whether the dependency graph is complete. A dependency graph is complete when it identifies that dependent configuration parameter values for the VMs can be resolved. If the dependency graph indicates that there is at least one configuration parameter value which is not resolved from another VM, processing logic prompts a user, such as a system administrator, to supply the values. If configuration does not begin (block 609), processing logic can send a notification of an error at block 611, for example, to a user and/or to a cloud controller (e.g., cloud controller 108 in FIG. 1).

If configuration can begin (block 609), processing logic can determine an order of configuring the VMs. Processing logic can configure the VMs that have complete configuration information before configuring VMs that have incomplete configuration information. At block 613, processing logic can configure the VMs that have complete configuration information by providing one or more post-boot configuration scripts (e.g., web IP configuration scripts, cloud configuration scripts, database configuration scripts, application configuration scripts) to the agent on the VMs that have complete configuration information, which the agent can run in the VM. The agents apply the scripts to generate configuration results (e.g., parameter values, indication that a service is started) and send results to the post-boot configuration server. The agents can also send a notification to the post-boot configuration server that a configuration is complete.

At block 615, processing logic receives configuration results (e.g., parameter values, indication that a service is started) and completion notifications from the agents of the VMs that have been configured and configures the VMs that have incomplete configuration information using the configuration results (e.g., parameter values, indication that a service is started) at block 617. Processing logic can send the configuration results (e.g., parameter values) for the incomplete configuration information to the agents in the VMs in the form of scripts. An agent can apply the script to the VM to complete the configuration.

For example, a load-balancer server VM, a reverse-proxy server VM, and a database VM each have complete configuration information and processing logic configures these VMs at block 613. At block 615, processing logic receives load balancer parameters (e.g., IP address, port number) from the agent on the load-balancer server VM, reverse proxy parameters from the agent of the reverse-proxy server VM, and database parameters from the agent of the database server VM. At block 617, processing logic sends the load-balancer parameters, reverse-proxy parameters, and database parameters to an agent on an application server VM. The agent applies the values to configure the application server VM and notifies the post-boot configuration server that the configuration is complete. For example, the agent plugs-in the values into a configuration file for the application server VM to configure the application server VM. In another example, the configuration parameters may not be a simple scalar value. For example, there is a load-balancer server VM that should be configured with the IP addresses of its clients. Processing logic can use the IP addresses received from agents to create a vector value of the IP addresses. Processing logic can send a post-boot configuration script that contains the vector value to the agent on the load-balancer server VM. In another example, there is a set of a first type of virtual machine and a set of a second type of virtual machine. Processing logic can communicate with the agents of the VMs to assign round-robin connections between the VMs.

At block 619, processing logic determines that the configuration of the identified VMs are complete based on the notifications received from the agents and sends a notification of the complete configurations, for example, to a cloud controller and/or a user (e.g., system administrator). Applications on the configured VMs may run and can communicate with each other accordingly as configured. For example, an application on the application server VM can communicate with the application on the load-balancer server VM using the configured IP address and port.

Figure 7:
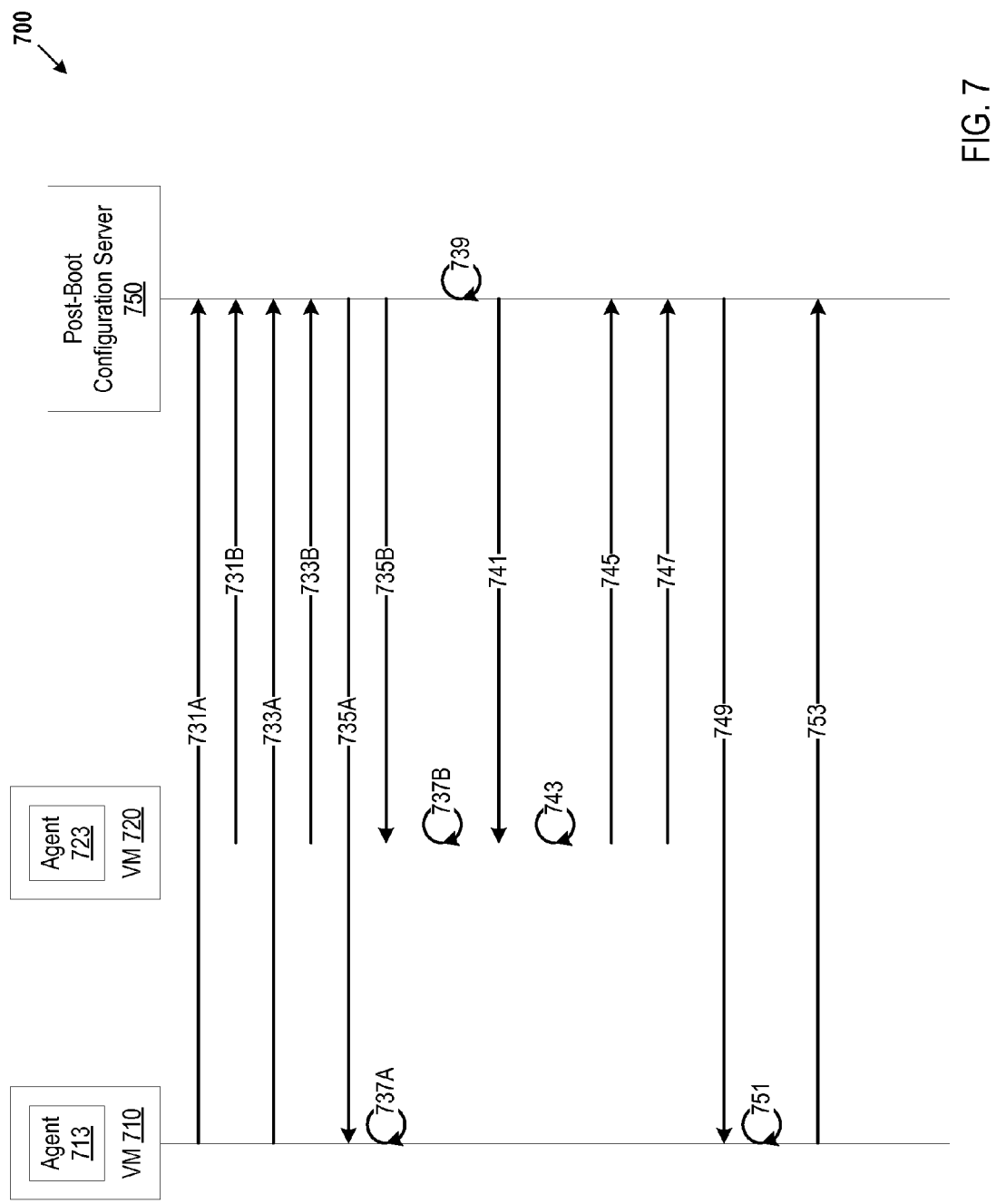
FIG. 7 is a block diagram of one embodiment of virtual machine agents communicating with a post-boot configuration server.

FIG. 7 is a block diagram 700 of one embodiment of agents 713,723 of virtual machines 710,720 communicating with a post-boot configuration server 750. A first virtual machine 710 can include an agent 713. A second virtual machine 720 can include an agent 723. The virtual machines 710,720 are part of the same deployment. When a virtual machine 710, 720 is started (e.g., powered-on, booted) in a cloud, the corresponding agents 713,723 establish 731A,731B a temporary secure communication with the post-boot configuration server 750. The agents 713,723 may use a designated port for communicating with the post-boot configuration server 750. The post-boot configuration server 750 may have a one time credential for accessing the cloud and host identity information that can be used to establish VPN (virtual private network) connections with the virtual machines 710,720. In one embodiment, each agent 713,723 maintains a log in a data repository that is coupled to the agent to log configuration progress. In one embodiment, if an agent 713,723 does not successfully establish communication with the post-boot configuration server 750, the agent 713,723 logs an error in the log and stops executing.

Each agent 713,723 provides 733A,B its UID (e.g., situationally unique identifier, contextually unique identifier) to the post-boot configuration server 750. The post-boot configuration server 750 can use the UIDs to determine which basic server configuration information and cloud information to send the agents 713,723. The basic server configuration information and cloud information can include standard server configuration scripts. The agents 713,723 can receive 735A,B the standard server configuration scripts and run 737A,B the scripts, for example, to locate root directories, determine locations of configuration files, mount images, etc.

The post-boot configuration server 750 can use 739 the UIDs to determine which post-boot configuration scripts to send to the agents 713,723. For example, the post-boot configuration server 750 may use the UID from the first VM 710 to obtain the ICICLE, template, assembly, and/or deployable that are associated with the UID. The post-boot configuration server 750 may determine from ICICLE, template, assembly, and/or deployable that the first VM 710 is to be configured as an application server VM and has configuration parameters that depend on a configuration result from configuring a load-balancer server VM.

The post-boot configuration server 750 may use the UID from the second VM 720 to obtain the ICICLE, template, assembly, and/or deployable that are associated with the UID. The post-boot configuration server 750 may determine from the ICICLE, template, assembly, and/or deployable that the second VM 720 is to be configured as a load-balancer server VM and generates parameter values that can be used to configure another VM, such as the first VM 710. The post-boot configuration server 750 determines that it should configure the second VM 720 before configuring the first VM 713 and sends post-boot configuration script(s) (e.g., web-IP configuration script) that are associated with a load-balancer server to the agent 723 for the second VM 720.

The agent 723 receives 741 the web-IP configuration script and executes 743 the web-IP configuration script to configure the VM 720 and generate parameter values, such as load-balancer server parameters (e.g., IP address, port number). The agent 723 provides 745 the generated parameter values to the post-boot configuration server 750. When the configuration of the VM 720 is complete, the agent 723 sends 747 a notification to the post-boot configuration server 750 of the complete configuration.

The post-boot configuration server 750 receives the parameter values and the notification of the completed configuration of the second VM 720 and determines that the configuration of the first VM may begin. The post-boot configuration server 750 sends 749 post-boot configuration script(s) (e.g., application configuration script) that are associated with an application server to the agent 713 for the first VM 710. The application configuration script can include the load-balancer parameters (e.g., IP address and port number of VM 720). The agent 713 receives 749 the application configuration script and executes 751 the application configuration script to configure the VM 710 using the parameter values. When the configuration of the VM 710 is complete, the agent 713 sends 753 sends a notification to the post-boot configuration server 750 of the complete configuration.

Figure 8:
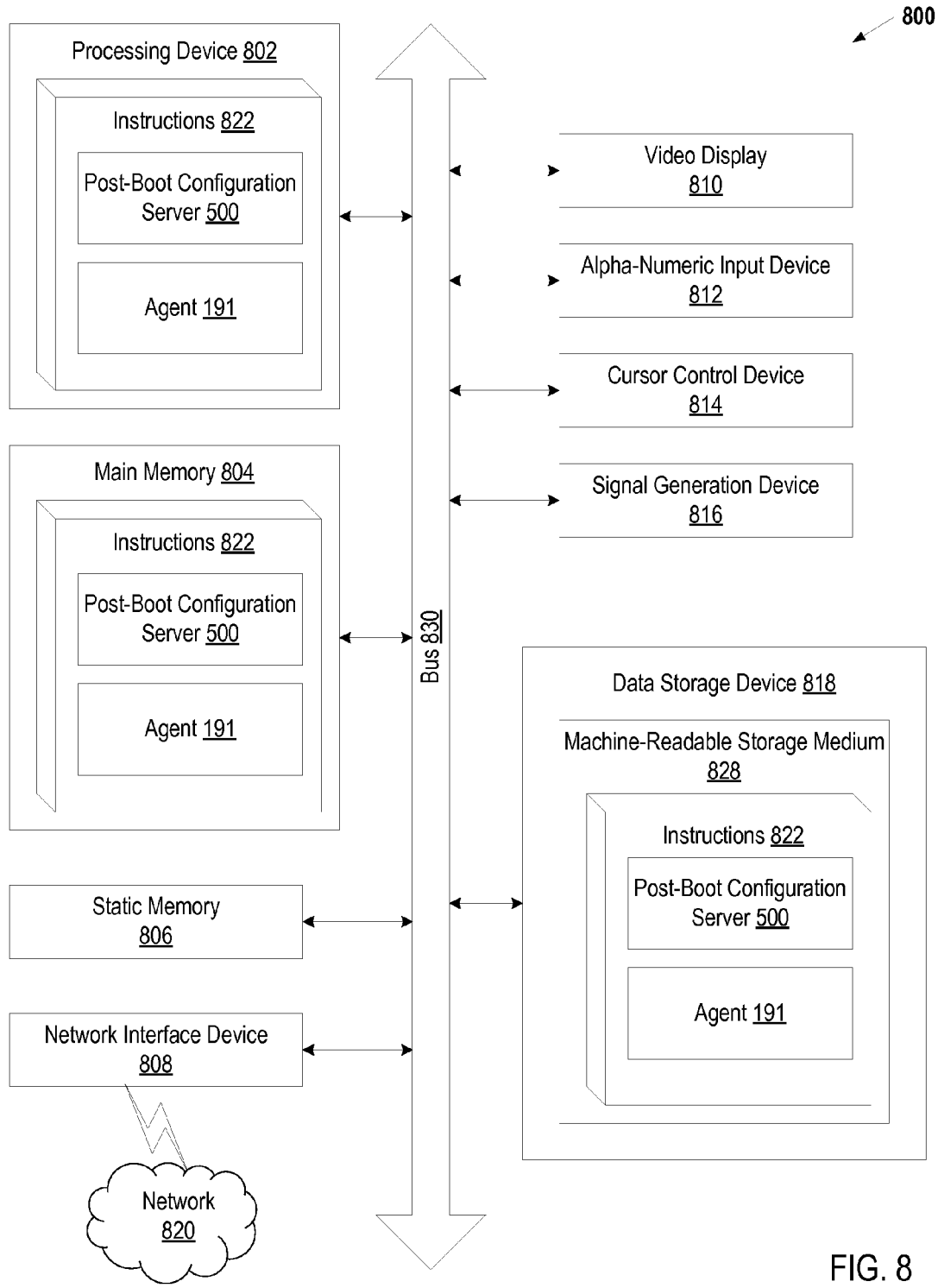
FIG. 8 is a block diagram of an exemplary computer system that may perform one or more of the operations described herein.

FIG. 8 illustrates a diagram of a machine in the exemplary form of a computer system 800 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 800 includes a processing device (processor) 802, a main memory 804 (e.g., read-only memory (ROM), flash memory, dynamic random access memory (DRAM) such as synchronous DRAM (SDRAM), double data rate (DDR SDRAM), or DRAM (RDRAM), etc.), a static memory 806 (e.g., flash memory, static random access memory (SRAM), etc.), and a data storage device 818, which communicate with each other via a bus 830.

Processor 802 represents one or more general-purpose processing devices such as a microprocessor, central processing unit, or the like. More particularly, the processor 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 802 may also be one or more special-purpose processing devices such as an application specific integrated circuit (ASIC), a field programmable gate array (FPGA), a digital signal processor (DSP), network processor, or the like. The processor 802 is configured to execute instructions 822 for performing the operations and steps discussed herein.

The computer system 800 may further include a network interface device 808. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The data storage device 818 may include a computer-readable storage medium 828 on which is stored one or more sets of instructions 822 (e.g., software) embodying any one or more of the methodologies or functions described herein. The instructions 822 may also reside, completely or at least partially, within the main memory 804 and/or within the processor 802 during execution thereof by the computer system 800, the main memory 804 and the processor 802 also constituting computer-readable storage media. The instructions 822 may further be transmitted or received over a network 820 via the network interface device 808.

In one embodiment, the instructions 822 include instructions for a post-boot configuration server (e.g., post-boot configuration server 500 of FIG. 5), an agent (e.g., agent 191 of FIG. 1) and/or a software library containing methods that call a post-boot configuration server and/or agent. While the computer-readable storage medium 828 (machine-readable storage medium) is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "identifying", "determining", "configuring", "searching", "sending," "receiving," "requesting," "providing," "generating," "adding," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain embodiments of the present invention also relates to an apparatus for performing the operations herein. This apparatus may be constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   determining, by a processor, that configuring a first virtual machine hosted by one or more physical machines in a cloud depends on a configuration result of configuring a second virtual machine hosted by the one or more physical machines in the cloud;
   instantiating the first virtual machine and the second virtual machine prior to configuring the first virtual machine and prior to configuring the second virtual machine;
   configuring the second virtual machine to determine the configuration result; and
   determining whether to configure the first virtual machine based on the configuration result.

2. The method of claim 1, wherein determining whether to configure the first virtual machine based on the configuration result comprises:
   searching application deployment data associated with the first virtual machine for indicators identifying one or more parameter values are dependent on the configuration result, wherein the application deployment data comprises at least one of a description of a service to be provided by a virtual machine, a description of a service to be used by a virtual machine, a description of at least one parameter value provided by a virtual machine, or a description of at least one parameter value to be used by a virtual machine.

3. The method of claim 1, wherein configuring the second virtual machine comprises:
   sending a script to an agent executing on the second virtual machine, wherein the agent runs the script to generate the configuration result, the configuration result comprising a value for at least one parameter to be used in configuring the first virtual machine.

4. The method of claim 1, further comprising configuring the first virtual machine by:
   receiving by the processor, a configuration result comprising at least one parameter value from an agent executing on the second virtual machine; and
   sending by the processor, a script and the at least one parameter value to an agent executing on the first virtual machine, wherein the agent runs the script to configure the first virtual machine using the at least one parameter value.

5. The method of claim 1, further comprising:
   determining by the processor that configuring the first virtual machine depends on at least one user-provided parameter value; and
   generating a signal requesting that a user provide the at least one user-provided parameter value.

6. The method of claim 1, further comprising:
   receiving by the processor, a notification from an agent executing on at least one of the first virtual machine or the second virtual machine indicating the corresponding virtual machine is configured; and
   sending by the processor a notification that configuration of the corresponding virtual machine is complete.

7. A method comprising:
   determining, by a processor, that configuring a first virtual machine hosted by one or more physical machines in a cloud depends on a configuration result of configuring a second virtual machine hosted by the one or more physical machines in the cloud;
   instantiating both the first and second virtual machines; and
   after the instantiating is complete:
      configuring the second virtual machine to determine the configuration result; and
      determining whether to configure the first virtual machine based on the configuration result.

8. The method of claim 7, wherein determining whether to configure the first virtual machine based on the configuration result comprises:
   searching application deployment data associated with the first virtual machine for indicators identifying one or more parameter values are dependent on the configuration result, wherein the application deployment data comprises at least one of a description of a service to be provided by a virtual machine, a description of a service to be used by a virtual machine, a description of at least one parameter value provided by a virtual machine, or a description of at least one parameter value to be used by a virtual machine.

9. The method of claim 7, wherein configuring the second virtual machine comprises:
   sending a script to an agent executing on the second virtual machine, wherein the agent runs the script to generate the configuration result, the configuration result comprising a value for at least one parameter to be used in configuring the first virtual machine.

10. The method of claim 7, further comprising configuring the first virtual machine by:
    receiving by the processor, a configuration result comprising at least one parameter value from an agent executing on the second virtual machine; and
    sending by the processor, a script and the at least one parameter value to an agent executing on the first virtual machine, wherein the agent runs the script to configure the first virtual machine using the at least one parameter value.

11. The method of claim 7, further comprising:
    determining by the processor that configuring the first virtual machine depends on at least one user-provided parameter value; and
    generating a signal requesting that a user provide the at least one user-provided parameter value.

12. The method of claim 7, further comprising:
    receiving by the processor, a notification from an agent executing on at least one of the first virtual machine or the second virtual machine indicating the corresponding virtual machine is configured; and
    sending by the processor a notification that configuration of the corresponding virtual machine is complete.

13. A system comprising:
    a memory,
    a network interface, and
    a processor operatively coupled to the memory and the network interface, the processor to:
       determine, by a processor, that configuring a first virtual machine hosted by one or more physical machines in a cloud depends on a configuration result of configuring a second virtual machine hosted by the one or more physical machines in the cloud;

instantiate the first virtual machine and the second virtual machine prior to configuring the first virtual machine and prior to configuring the second virtual machine;

configure the second virtual machine to determine the configuration result; and determine whether to configure the first virtual machine based on the configuration result.

14. The system of claim 13, wherein to determine whether to configure the first virtual machine based on the configuration result, the processor is to:

search application deployment data associated with the first virtual machine for indicators identifying one or more parameter values are dependent on the configuration result, wherein the application deployment data comprises at least one of a description of a service to be provided by a virtual machine, a description of a service to be used by a virtual machine, a description of at least one parameter value provided by a virtual machine, or a description of at least one parameter value to be used by a virtual machine.

15. The system of claim 13, wherein to configure the second virtual machine, the processor is to:

send a script to an agent executing on the second virtual machine, wherein the agent runs the script to generate the configuration result, the configuration result comprising a value for at least one parameter to be used in configuring the first virtual machine.

16. The system of claim 13, wherein the processor further to configure the first virtual machine by:

receive a configuration result comprising at least one parameter value from an agent executing on the second virtual machine; and send a script and the at least one parameter value to an agent executing on the first virtual machine, wherein the agent runs the script to configure the first virtual machine using the at least one parameter value.

17. The system of claim 13, wherein the processor is further to:

determine that configuring the first virtual machine depends on at least one user-provided parameter value; and generate a signal requesting that a user provide the at least one user-provided parameter value.

18. The system of claim 13, wherein the processor is further to:

receive a notification from an agent executing on at least one of the first virtual machine or the second virtual machine indicating the corresponding virtual machine is configured; and send a notification that configuration of the corresponding virtual machine is complete.

19. A non-transitory computer-readable medium including instructions that, when executed by a processor, cause the processor to:

determine that configuring a first virtual machine hosted by one or more physical machines in a cloud depends on a configuration result of configuring a second virtual machine hosted by the one or more physical machines in the cloud;

instantiate both the first and second virtual machines; and after the instantiating is complete:

configure the second virtual machine to determine the configuration result; and determine whether to configure the first virtual machine based on the configuration result.

20. The non-transitory computer-readable medium of claim 19, wherein determining whether to configure the first virtual machine based on the configuration result comprises:

search application deployment data associated with the first virtual machine for indicators identifying one or more parameter values are dependent on the configuration result, wherein the application deployment data comprises at least one of a description of a service to be provided by a virtual machine, a description of a service to be used by a virtual machine, a description of at least one parameter value provided by a virtual machine, or a description of at least one parameter value to be used by a virtual machine.

21. The non-transitory computer-readable medium of claim 19, wherein to configure the second virtual machine, the processor is to:

send a script to an agent executing on the second virtual machine, wherein the agent runs the script to generate the configuration result, the configuration result comprising a value for at least one parameter to be used in configuring the first virtual machine.

22. The non-transitory computer-readable medium of claim 19, further comprising instructions to configure the first virtual machine, the processor is to:

receive a configuration result comprising at least one parameter value from an agent executing on the second virtual machine; and send a script and the at least one parameter value to an agent executing on the first virtual machine, wherein the agent runs the script to configure the first virtual machine using the at least one parameter value.

23. The non-transitory computer-readable medium of claim 19, further comprising instructions wherein the processor is further to:

determine that configuring the first virtual machine depends on at least one user-provided parameter value; and generate a signal requesting that a user provide the at least one user-provided parameter value.

* * * * *